(12) United States Patent
Gardner et al.

(10) Patent No.: US 10,907,796 B2
(45) Date of Patent: Feb. 2, 2021

(54) COOPERATIVE LIGHT SHOW

(71) Applicant: G & S Innovations, LLC, Lake Forest, CA (US)

(72) Inventors: Michael S. Gardner, Lake Forest, CA (US); Timothy W. Smith, Lake Forest, CA (US); Andrew R. Mines, Lake Forest, CA (US)

(73) Assignee: G & S Innovations, LLC, Lake Forest, CA (US)

( * ) Notice: Subject to any disclaimer, the term of this patent is extended or adjusted under 35 U.S.C. 154(b) by 0 days.

(21) Appl. No.: 16/398,024

(22) Filed: Apr. 29, 2019

(65) Prior Publication Data
US 2019/0331320 A1    Oct. 31, 2019

Related U.S. Application Data

(60) Provisional application No. 62/663,890, filed on Apr. 27, 2018.

(51) Int. Cl.
*F21V 9/08* (2018.01)
*G02B 7/00* (2006.01)

(52) U.S. Cl.
CPC .............. *F21V 9/083* (2013.01); *G02B 7/006* (2013.01)

(58) Field of Classification Search
None
See application file for complete search history.

(56) References Cited

U.S. PATENT DOCUMENTS

2014/0078594 A1* 3/2014 Springer .................. G02B 7/16
   359/672
2017/0303790 A1* 10/2017 Bala ...................... H04N 5/2258

* cited by examiner

*Primary Examiner* — Ashok Patel
(74) *Attorney, Agent, or Firm* — Paul J. Backofen, Esq.

(57) ABSTRACT

One or more colored films selectively change the color of the displayed light from one or more mobile devices to enable crowd participation is a multi-colored light show at public gatherings. The ability to change the color of a mobile device flash may also be useful for providing identification at a distance in low light conditions.

5 Claims, 2 Drawing Sheets

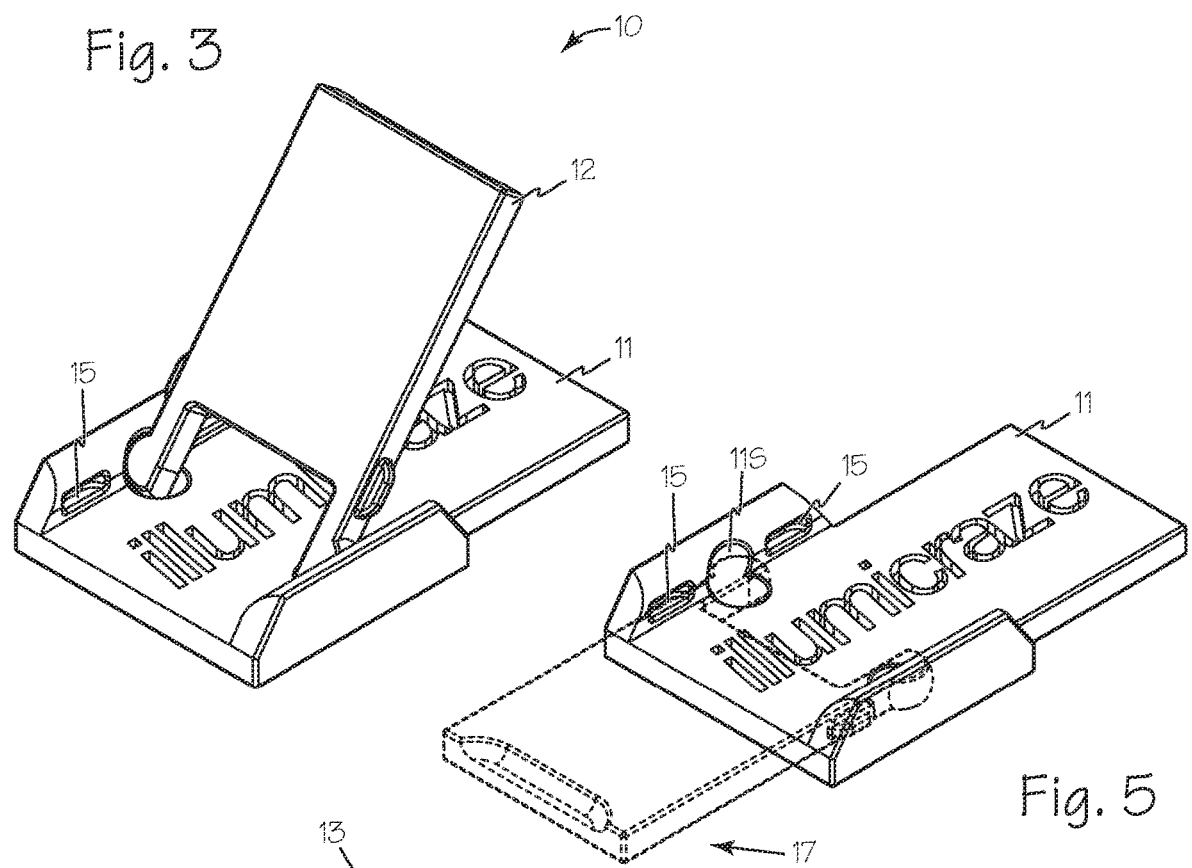
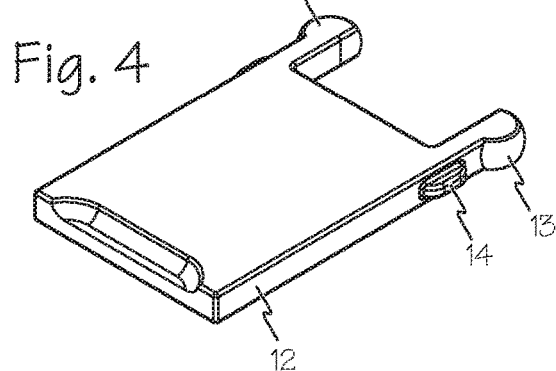
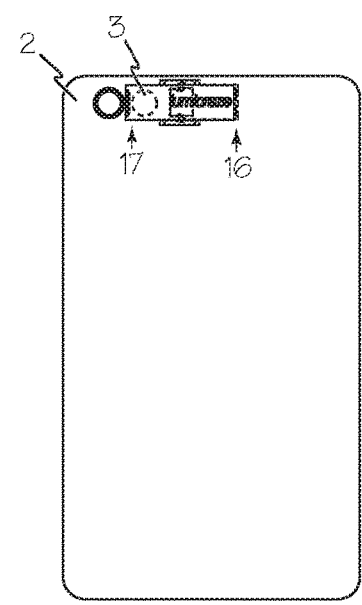

COOPERATIVE LIGHT SHOW

This application claims priority to U.S. Provisional Application 62/663,890, filed Apr. 27, 2018.

FIELD OF THE INVENTIONS

The inventions described below relate to the field of multi-color light shows using mobile devices.

BACKGROUND OF THE INVENTIONS

Crowd participation is a popular element of public gatherings such as sporting events. Conventional mobile devices provide a generally white flash for use in photography. These generally white flash lights often used by crowds in large group demonstrations are limited to emitting white light.

SUMMARY

The devices and methods described below provide for selectively changing the color of the displayed light from one or more mobile devices to enable crowd participation in a multi-colored light show at public gatherings. The ability to change the color of the light from a mobile device flash may also be useful for providing identification at a distance in low light conditions.

Alternatively, the color of the light emitted by the light of a mobile device flash may be selectively changed with software changing the frequency of the light emitted from the LED flash.

BRIEF DESCRIPTION OF THE DRAWINGS

FIG. 3 is a perspective view of a flip filter for mobile devices.

FIG. 4 is a perspective view of a colored filter for the flip filter of FIG. 3.

FIG. 5 is a perspective view of a flip filter mount for the flip filter of FIG. 3.

FIG. 6 illustrates a mobile device with the flip filter of FIG. 3 attached and deployed.

DETAILED DESCRIPTION OF THE INVENTIONS

Figure 1:
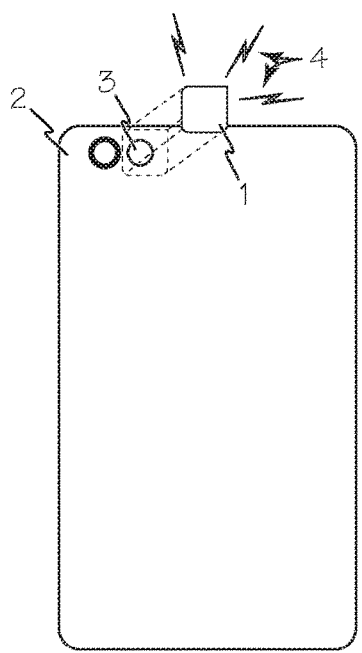
FIG. 1 illustrates the application of a color changing film to a mobile device.

FIG. 1 illustrates the application of a colored film 1 to a mobile device 2. Mobile device 2 may be any suitable mobile device with a flash light 3. The application of colored film 1 over flash light 3 will change the dominant color of emitted light 4.

Figure 2:
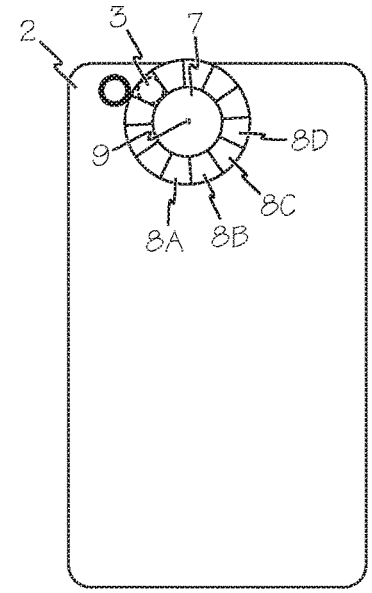
FIG. 2 illustrates a mobile device with a wheel of colored filters.

Alternatively, as illustrated in FIG. 2, a wheel 7 or other suitable carrier may contain a selection of different colored films or gels such as color films 8A, 8B, 8C and 8D. Color wheel 7 may be temporarily or permanently attached to the mobile device to enable rotation of the wheel about pivot 9 to orient a selected colored film over flash light 3. Color wheel 7 may also be permanently or temporarily affixed to a mobile device or a mobile device case.

The color of the emitted light 4 may be selectively changed with software changing the frequency of the light emitted from the LCD flash light 3.

In use, a user may affix a preselected colored film 1 to a mobile device 2 to enable the user to display light of a preselected color when the user turns on flash light 3. One or more users with similarly or differently colored films affixed to their mobile devices may coordinate the use of their flash lights to produce a light show with emitted light of different dominant colors.

Flip filter 10 of FIG. 3 has a mount or holder 11 that is secured to a mobile device or other device with a light source and removable colored filter 12. The colored filter 12 of FIG. 4 may be produced in any suitable color and any chosen color filter may engage mount 11. Mount or holder 11 has sockets 11S for engaging the nubs 13 on the colored filter. Each colored filter has one or more teeth 14 that engage complementary slots 15 in mount or holder 11.

Referring now to FIGS. 5 and 6, flip filter 10 may be used by securing mount or holder 11 to any suitable device such as mobile device 2. A suitable colored filter 12 engages the mount or holder such that the colored filter may be pivoted from an open position 16 into a deployed position 17. In the deployed position the colored filter overlays the flash 3 to change the color of the emitted light.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A method of crowd participation in a multi-colored light show at public gatherings comprising the steps:
   a plurality of users with mobile devices, each mobile device having a flash light, deploying a colored filter on each of their mobile devices;
   the plurality of users coordinating the use of their flash lights with a colored filter to produce a light show with emitted light of different dominant colors.

2. The method of claim 1 wherein the step of deploying a colored filter on each of their mobile devices comprises deploying a colored filter selected from two different colored filters on each of their mobile devices.

3. The method of claim 1 wherein the step of deploying a colored filter on each of their mobile devices comprises deploying a colored filter selected from three different colored filters on each of their mobile devices.

4. The method of claim 1 wherein the step of deploying a colored filter on each of their mobile devices comprises deploying a colored filter selected from four different colored filters on each of their mobile devices.

5. The method of claim 1 wherein the step of deploying a colored filter on each of their mobile devices comprises deploying a colored filter selected from five different colored filters on each of their mobile devices.

* * * * *